US012742481B2

(12) United States Patent
Wise

(10) Patent No.: US 12,742,481 B2
(45) Date of Patent: Sep. 22, 2026

(54) ACTUATOR ASSEMBLY FOR USE WITH A CLUTCH

(71) Applicant: Means Industries, Inc., Saginaw, MI (US)

(72) Inventor: William D Wise, Bay City, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 19/149,684

(22) PCT Filed: Nov. 21, 2024

(86) PCT No.: PCT/US2024/056836
§ 371 (c)(1),
(2) Date: Jul. 21, 2025

(87) PCT Pub. No.: WO2025/117314
PCT Pub. Date: Jun. 5, 2025

(65) Prior Publication Data

US 2026/0117828 A1 Apr. 30, 2026

Related U.S. Application Data

(60) Provisional application No. 63/603,916, filed on Nov. 29, 2023.

(51) Int. Cl.

| | |
|---|---|
| ***F16D 48/06*** | (2006.01) |
| ***F16D 27/14*** | (2006.01) |
| *B60K 17/02* | (2006.01) |

(52) U.S. Cl.
CPC .......... *F16D 48/064* (2013.01); *F16D 27/14* (2013.01); *B60K 17/02* (2013.01); (Continued)

(58) Field of Classification Search
CPC .............................. F16D 48/064; F16D 27/14
(Continued)

(56) References Cited

U.S. PATENT DOCUMENTS

| | | | | |
|---|---|---|---|---|
| 4,684,866 | A * | 8/1987 | Nehmer | H02P 8/14 318/696 |
| 6,208,498 | B1 | 3/2001 | Ueda | |

(Continued)

FOREIGN PATENT DOCUMENTS

| | | | | |
|---|---|---|---|---|
| DE | 112017006412 | T5 * | 8/2019 | G01D 5/2448 |
| EP | 3235677 | A1 * | 10/2017 | H02P 1/465 |

(Continued)

OTHER PUBLICATIONS

PCT/US2024/056836, International Search Report, Jan. 31, 2025.
PCT/US2024/056836, Written Opinion, Jan. 31, 2025.
PCT/US2024/056836, Examiner Search Strategy, Jan. 21, 2025.

*Primary Examiner* — Jacob S. Scott
*Assistant Examiner* — Michael E Butler
(74) *Attorney, Agent, or Firm* — Burgess Law Office, PLLC

(57) ABSTRACT

A clutch assembly and method for controlling torque distribution of the clutch assembly based on the movement of an actuator. The clutch assembly includes a selectable clutch having a first position and a second position, an actuator, and a controller. The controller monitors current feedback from the actuator and detects motion of the actuator based on current feedback.

7 Claims, 12 Drawing Sheets

(52) U.S. Cl.
CPC ................ *F16D 2500/1022* (2013.01); *F16D 2500/10412* (2013.01); *F16D 2500/10493* (2013.01); *F16D 2500/1107* (2013.01); *F16D 2500/3022* (2013.01); *F16D 2500/3028* (2013.01)

(58) Field of Classification Search
USPC ........................................................... 701/68
See application file for complete search history.

(56) References Cited

U.S. PATENT DOCUMENTS

| | | | |
|---|---|---|---|
| 12,331,819 B1 * | 6/2025 | Walter | F16H 48/28 |
| 2001/0027907 A1 | 10/2001 | Nishida et al. | |
| 2001/0035324 A1 | 11/2001 | Okuma et al. | |
| 2005/0279607 A1 | 12/2005 | Fuscgi | |
| 2022/0388163 A1 * | 12/2022 | Ducharme | B25J 9/1612 |
| 2025/0162429 A1 * | 5/2025 | Baker | B60L 15/2036 |

FOREIGN PATENT DOCUMENTS

| | | | |
|---|---|---|---|
| EP | 1857702 B1 | 12/2021 | |
| WO | WO-2021064449 A1 * | 4/2021 | F16D 48/064 |

* cited by examiner 10
52
14
54
64
72
78
60
74
56
24
22
82
80
70
66
58
50
16
62
50
28
26
28
12
20
34
18
44
30
32
84

10
12
60
84
24
3
3

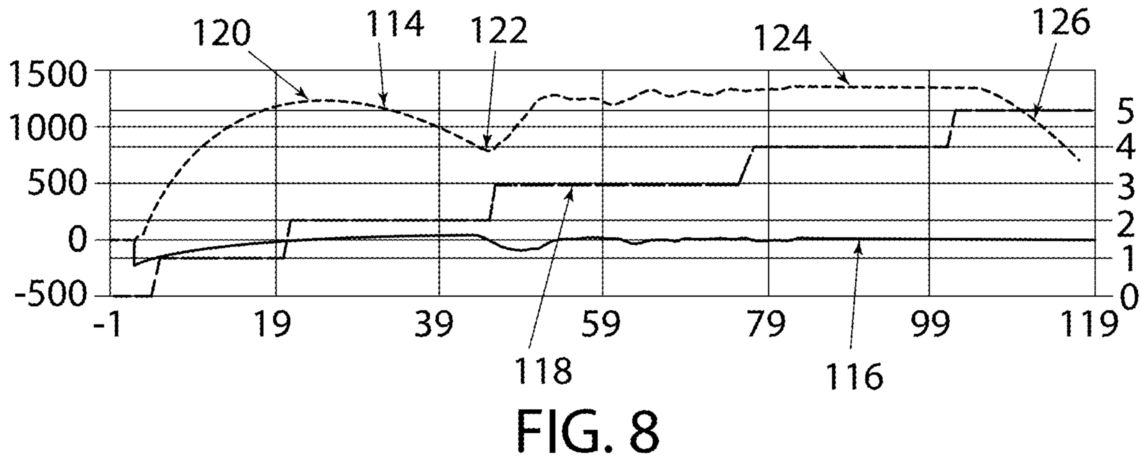
FIG. 8
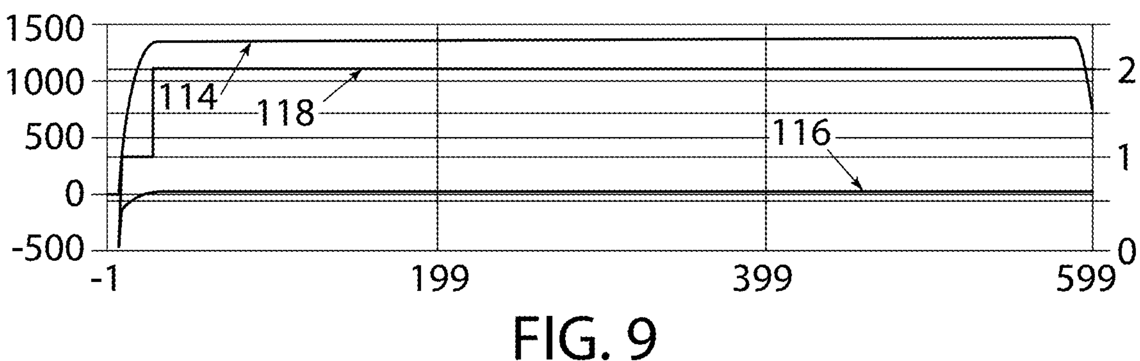
FIG. 9
| Actuation | T.T.T. |
|---|---|
| Actuation | T.T.T. |
FIG. 10

ACTUATOR ASSEMBLY FOR USE WITH A CLUTCH

CROSS-REFERENCE TO RELATED APPLICATIONS

This application is a National Stage of International Application No. PCT/US2024/056836, filed Nov. 21, 2024, and claims the benefit of U.S. Provisional Application No. 63/603,916, filed on Nov. 29, 2023. The disclosures of the above applications are incorporated herein by reference.

BACKGROUND OF THE INVENTION

1. Field of the Invention

A coupling or clutch assembly, including a coupling or clutch assembly controlling engagement and disengagement of components and, more specifically, an assembly for use with the coupling or clutch assembly.

2. Description of Related Art

A power transmission assembly may use a coupling or clutch assembly connecting an input, for example, an electric motor, to an output, for example, a vehicle wheel.

U.S. Pat. Nos. 7,258,214 and 7,344,010 disclose overrunning coupling assemblies and U.S. Pat. No. 7,484,605 discloses an overrunning radial coupling assembly or clutch.

U.S. Patent Publication No. 2021/0301885 discloses a coupling and control assembly, including a translator mounted for linear movement and at least one non-contact, linear inductive displacement sensor that senses a translator position. The sensor determines the movement of the translator to an end of travel position. For example, a first end of travel position is associated with the deployment of the locking element or strut, and a second end of travel position is associated with the nondeployment of the locking element or strut.

One example of a conventional actuation system includes a two-position actuator. With a two-position actuator, there are three translator position states: fully disengaged, fully engaged, and indeterminate, where the translator is neither fully engaged nor disengaged. A typical position sensor detects one state, for example, engaged or disengaged, and the converse is the translator is not in the detected state. In addition, there are sensors with higher functionality; a single sensor detects all three positions. Another example employs two sensors, one detecting a fully engaged position and the other detecting a fully disengaged position. Multiple-position actuators, for example, three or four-position actuators, are also known, typically using multiple coils interspersed between plates.

The use of a sensor to determine translator movement and position results in additional costs for the system. A sensor is an additional component that can malfunction. Sensors also raise packaging concerns. Precautions have to be taken to shield a Hall effect sensor from the magnetic fields of the coils or electric/traction motors, or only reporting position when the coils are not energized, or the electric/traction motor fields are not excessive and do not interfere with the sensor.

Absent the sensor, conventional systems presume the translator moves to an end of travel position after applying voltage to the coil for a predetermined time. Vehicle control systems may use speed sensors to detect if a transmission is in the desired gear state. They may monitor torque in the system, for example, motor current in electric motors or torque estimation algorithms using engine speed, air, and fuel on internal combustion engines.

Conventional actuators operate by supplying voltage to and driving the coil at a predetermined magnitude and length of time—an open-loop control system. One example of an open system includes applying a voltage to the actuator for a predetermined time, e.g., 150 milliseconds (ms), based on actuator parameters. The actuator on, or operation, time may consider multiple operating conditions and typically includes a design factor. For example, operating the actuator in low temperatures or under low voltage may result in low/decreased current flow in the actuator. The predetermined time should be long enough to ensure the current reaches and maintains a steady state for a specified period, a time when the translator is presumed to move to a selected position. Conventional systems apply current to the actuator longer than necessary to make sure the actuator has moved to the selected position. Using a longer time than needed to accomplish the actuation results in non-value added time; it extends cycle time and delays torque application because torque is not applied until the end of the predetermined period. Present actuation technology blocks torque application longer than necessary to ensure the actuator has moved, making shift times longer. Conventional actuators also use more energy, as actuation voltage is continuously applied over the predetermined time. They may also generate waste heat that can limit the continuous duty cycle of the actuator.

A conventional actuator operation provides voltage and corresponding current flow for a predetermined time to the actuator. The predetermined time creates a time delay, non-value added time, between the end of the motion of the translator and the start of torque imposition. Even though the actuator has acted on the strut or locking member, causing it to deploy and couple the drive member or torque-imposing component—the pocket plate with the driven member or torque-receiving component—the notch plate, the vehicle controller does not impose torque until the end of the predetermined time, until the 150 ms is complete. This time delay results in delayed torque imposition, delayed shift times, and increased energy usage as current is continuously supplied even though the actuator has ceased motion. For example, if the actuator reaches full travel and stops motion after 30 ms, torque imposition is still delayed for an additional 120 ms, the remainder of the predetermined period of 150 ms.

SUMMARY OF THE INVENTION

A torque transmission assembly includes an actuator, and the actuator includes a stator with a coil and a translator with a magnet. The assembly includes a back EMF detection unit generating a signal based on the movement of the translator relative to the stator. The actuator moves a coupling member. The coupling member transfers the torque from a drive member to a driven member.

Further areas of applicability of the present invention will become apparent from the detailed description provided hereinafter. It should be understood that the detailed description and specific examples while indicating the preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein:

FIG. 8 is a graphic representation illustrating the motion state of a translator of an actuator associated with a current flow through a coil of an actuator.

FIG. 9 is a graphic representation illustrating the current flow through a coil of an actuator where the translator of the actuator remains stationary.

FIG. 10 is a drawing of a further exemplary embodiment illustrating torque application time.

DETAILED DESCRIPTION OF THE PREFERRED EMBODIMENTS

Figure 1:
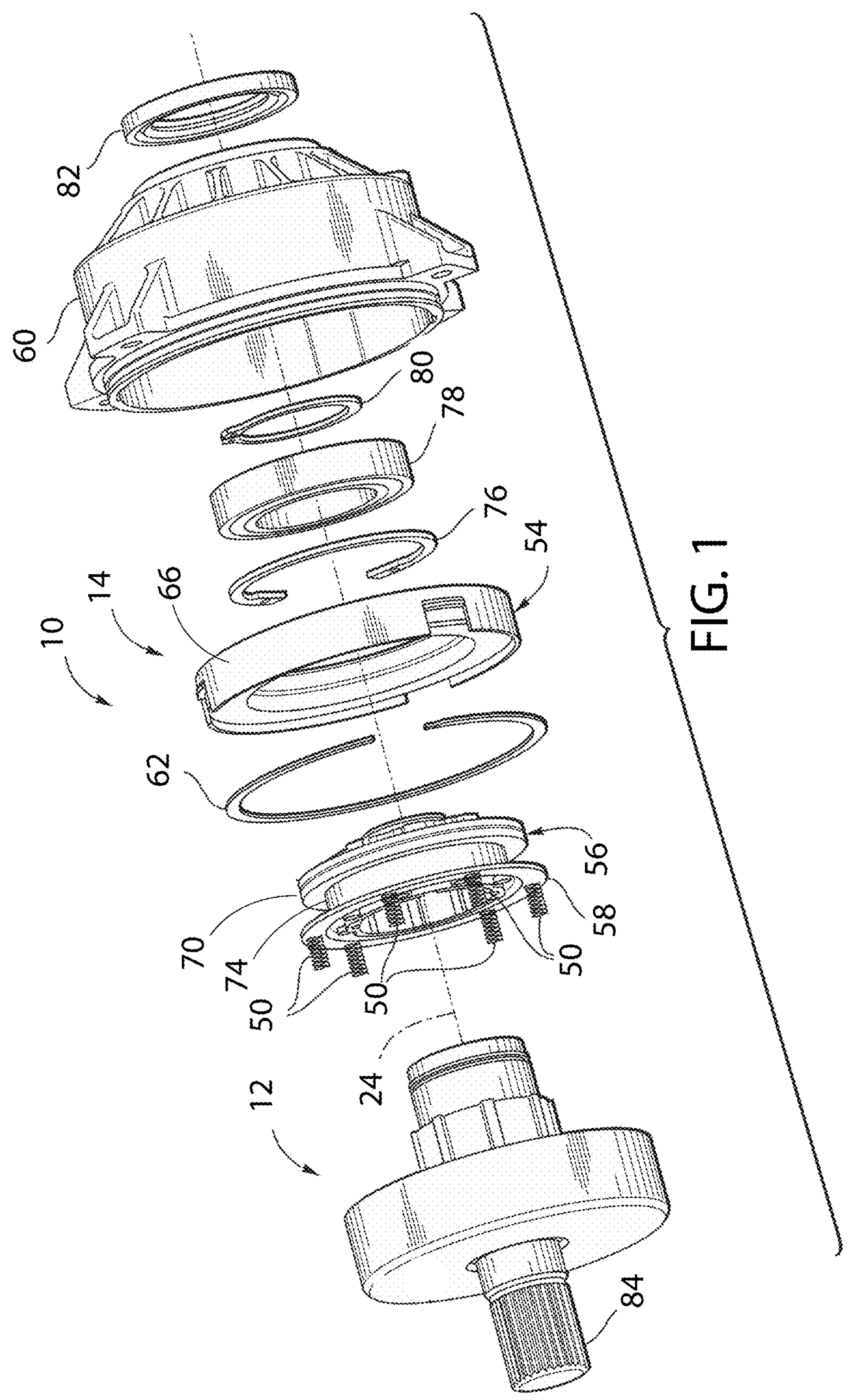
FIG. 1 is an exploded view of a dynamically controllable clutch ("DCC").

The following description of the preferred embodiment(s) is merely exemplary in nature and is in no way intended to limit the invention, its application, or its uses.

Examples of the present invention are disclosed herein; however, it is understood that the disclosed embodiments are merely exemplary of the invention that may be embodied in various and alternative forms. The figures are not necessarily to scale; some features may be exaggerated or minimized to show details of the components. Therefore, specific structural and functional details disclosed herein are not to be interpreted as limiting but merely as a representative basis for teaching one skilled in the art to employ the present invention.

A power transmission system or vehicle driveline assembly typically includes an input or drive member, for example, an electric or traction motor, and an output or driven member, for example, an output shaft connected to a vehicle wheel. The power transmission system or vehicle driveline assembly may incorporate multiple coupling elements connecting or coupling the input drive member to the output or driven member. The power transmission system may include electric or traction motors, planetary drive trains, and layshaft drive trains, both concentric and parallel axis configurations.

One example of a power transmission system or assembly includes a gear system or gear set. The term "gear set" broadly refers to a gear mechanism for transmitting motion and, in one example, includes a set of gears forming a group. In another example, an electric or traction motor is directly coupled to the vehicle wheel.

One example of a coupling or clutch assembly connecting an input to an output includes a one-way clutch, a first coupling member, a second coupling member, and at least one locking element between opposing surfaces of the coupling members. The locking element moves between a deployed or engaged position, in which the locking element extends from the first coupling member and engages the second coupling member, and a nondeployed or disengaged position, in which the locking element does not extend from the first coupling member and does not engage the second coupling member. In the deployed position, the locking element engages the second coupling member, wherein the one-way clutch locks in one direction of rotation but has free rotation in the opposite direction.

An active or selectable one-way clutch typically includes a control mechanism or actuator that activates or deactivates the one-way clutch to enable or disable a drive connection or engaged state between components. When deactivated, the one-way clutch produces no drive connection or engaged state between the components and transfers no torque. When activated, the one-way clutch produces a drive connection or engaged state, transfers torque between components when their relative rotation is in one direction, and overruns in the same manner as the passive one-way or overrunning clutch. An active one-way clutch may not engage and may operate passively when placed in an activated position. Even though the active one-way clutch is activated, depending on the relative movement of the components, it may not actively engage and will not produce a drive connection or engaged state. However, because it is in an activated position, it engages and transfers torque based on the relative movement of the components.

An active one-way clutch may also be referred to as a selectable or controllable one-way clutch because the state of the clutch, activated or deactivated, can be selected or controlled. An active one-way clutch may be a dynamically controllable clutch. A dynamically controllable clutch refers to a controllable or selectable, active one-way clutch acting between two rotating components, for example, one where both races are rotatable.

The term "coupling" or "clutch" should be interpreted to include clutches or brakes wherein one of the plates is driveably connected to a torque delivery element of a transmission, engine, or motor, and the other plate is connected to another torque delivery element or grounded in the case of a brake. The terms "coupling," "clutch," and "brake" may be used interchangeably.

The power transmission system or assembly functions as a torque-transmitting mechanism between components.

FIGS. 1-5 show a coupling assembly, generally indicated at 10. The assembly 10 includes a coupling subassembly, for example, a dynamically controllable clutch (DCC), generally indicated at 12, and an actuation system, generally indicated at 14. The dynamically controllable clutch (DCC) 12 operates to couple an input power component (e.g., a drive shaft) and an output power component (e.g., a driven shaft).

The dynamically controllable clutch (DCC) 12 has a radially inner rotating race, i.e., a first coupling member in the form of a pocket plate 16, and a radially outer rotating race, i.e., a second coupling member in the form of a notch plate 18. The pocket plate 16 may include inner splines 22 used to fixedly connect the pocket plate 16 to one power component of the system, and the notch plate 18 is fixedly connected to another power component, for example, a splined shaft 84. Consequently, the first and second power components are connected when pocket and notch plates 16, 18 are connected.

The pocket plate 16 contains first and second sets of locking elements 20 for clockwise ("CW") and counter-clockwise ("CCW") engagement, respectively. During engagement, at least one set of locking elements 20 simultaneously contacts the pocket and notch engagement faces of the pocket and notch plates 16, 18, connecting the pocket and notch plates 16, 18. The pocket and notch plates 16, 18 connect the first and second power components. Consequently, in each locked direction of rotation, the dynamically controllable clutch (DCC) 12 controllably transmits torque between the power components, which are connected via the connected pocket and notch plates 16, 18.

The pocket plate 16 rotates in either a clockwise or counterclockwise direction about the rotational axis 24 of the assembly 10. The pocket plate 16 includes a generally flat, annular coupling face 26 having a plurality of pockets 28, each pocket 28 sized and shaped to receive and nominally retain a locking element 20. The pockets 28 are angularly spaced about the rotational axis 24 of the assembly 10.

As shown, the notch plate 18 has a generally flat, annular coupling face 30 opposite the generally flat, annular coupling face 26 of the pocket plate 16. Both coupling faces 26, 30 face axially in opposite directions along the rotational axis 24 of the coupling assembly 10. The flat, annular coupling face 30 of the notch plate 18 has a plurality of locking formations or notches 32. The locking elements engage the locking formations or notches 32 when the locking elements 20 are deployed. In the deployed position, the locking elements 20 project or pivot outward from the pockets 28 in the pocket plate 16, past the annular coupling face 26, to prevent relative rotation of the pocket and notch plates 16, 18 in at least one direction about the rotational axis 24 of the assembly 10.

Each locking element 20 includes a member-engaging first end surface, a member-engaging second end surface, and an elongated central body portion between the end surfaces. Each locking element 20 may also include a projecting outer pivot that extends laterally from its central body portion to enable pivotal motion of the locking element 20 about a pivot axis of the locking element 20 intersecting the pivot. The end surfaces of the locking element 20 move between engaged and disengaged positions between the pocket and notch plates 16, 18 during the pivotal motion, whereby one-way torque transfer may occur between the pocket and notch plates 16, 18 in the engaged positions of the locking elements 20.

The assembly 10 includes an apertured retainer element or cover plate, generally indicated at 34, supported between the pocket and notch plates 16, 18. The retainer element or cover plate 34 retains the locking element 20 in their respective pockets 28. The retainer element 34 has a plurality of spaced openings 36 extending therethrough to allow the locking elements 20 to extend therethrough and lock the respective pocket and notch plates 16, 18 together. In one example, a surface of the central body portion of the locking element 20 pivots against a surface of the retainer element or cover plate 34 during the movement of the locking element 20.

The retainer or cover plate 34 is prevented from rotating relative to the pocket plate 16 by shoulders circumferentially spaced about the outer periphery of the retainer or cover plate 34.

A snap ring 40 in a groove 42 formed in the inner axial annular surface 38 of the notch plate 18 retains the notch plate 18 and the pocket plate 16 together.

The pocket plate 16 also has a face 44 opposite the flat, annular coupling face 26. A plurality of axially extending passages 46 are spaced about the rotational axis 24 of the assembly 10. Each passage 46 communicates with an associated pocket 28. The passages 46 communicate actuating forces to their respective locking elements 20 within their respective pockets 28. The passages 46 extend between the annular coupling face 26 of the pocket plate 16 and an opposite face 44 of the pocket plate 16. The opposite face 44 of the pocket plate 16 is closer to the actuation system 14. The annular coupling face 26 and opposite face 44 of the pocket plate 16 are generally annular and extend generally radially to the rotational axis 24 of the coupling assembly 10.

Actuation members, for example, springs 50, are received within the passages 46 to provide the actuating forces to actuate the locking elements 20 within their respective pockets 28 so the locking elements 20 move between their engaged and disengaged positions. Other plungers or actuators may provide the actuating forces, including elastically deformable plungers or actuators. The walls of the passages 46 are rigid, so the springs 50 are radially supported at high rotational speeds of the pocket plate 16.

In one example, the actuation system 14 is a linear motor or linear actuator 52 that actuates the dynamically controllable clutch (DCC) 12. The linear actuator 52 includes a stator 54 and a translator 56. In one example, the stator 54 is held in position against a case 60 via snap ring 62. The translator 56 is secured to a translator hub or carriage 74, which is slidably mounted adjacent to the pocket plate 16. The linear actuator 52 actively controls an operating mode of the coupling assembly by generating an electromagnetic force with the stator 54 that interacts with the translator 56, causing the translator 56 to slide or move back and forth axially with respect to the pocket plate 16. Axial movement of the translator 56 acts on an actuation member or spring 50.

As shown, the translator 56 is operatively connected to the actuation members or springs 50 via an annular plate 58, which linearly moves the actuation members or springs 50 in unison. The springs 50 are supported on the plate 58 by spring supports formed on the plate 58. The translator 56 moves upon receiving a translational force and linearly moves the actuation members or springs 50 within their passages 46.

The stator 54 includes two electromagnetically inductive coils 64 that create a magnetic flux when one or both coils 64 are energized. The stator coils 64 are wound in parallel, in opposite directions, with reversed polarity relative to one another. The stator 54 also includes a ferromagnetic housing, generally indicated at 66, having spaced apart fingers 68, with the electromagnetically inductive coils 64 housed between adjacent fingers 68.

The translator 56 includes a magnetic annular segment 70 and a pair of ferromagnetic backing rings 72. The magnetic annular segment 70 and ferromagnetic backing rings 72 are connected to the translator hub or carriage 74. The magnetic annular segment 70 is sandwiched between the ferromagnetic backing rings 72.

A first magnetic control force is applied to the translator 56 when the coils 64 are energized, causing the translator 56 to move in one direction along the rotational axis 24. By reversing the current direction in the stator 54, the magnetic control force applied to the translator 56 causes the translator 56 to move in the opposite direction along the rotation axis 24.

The magnetic control forces magnetically bias the fingers 68 and corresponding ferromagnetic backing rings 72 into alignment upon coil energization. The magnetic forces latch the translator 56 and corresponding actuation members or springs 50 in their "on" and "off" positions. In the "on" position, the locking elements are in the deployed position. In the "off" position, the locking elements are in the non-deployed position. The rings 70, 72 are acted upon by the stator 54 to move the translator 56. The energized stator coils 64 produce both a magnetic field that repels the steady state field generated by the magnetic annular segment 70 and a magnetic field that attracts the steady state field generated by the magnetic annular segment 70. The combination of repelling and attracting forces caused by the stator coils 64 causes the translator 56 to move.

The translator 56 is supported for axial movement with the translator hub or carriage 74. The translator hub or carriage 74 moves axially on a shaft portion, which may be integral with or connected to the pocket plate 16. The translator hub or carriage 74 slidably supports the plate 58 during shifting or translational movement, axial motion along the rotational axis 24.

The plate 58 operatively connects to the translator 56 for selective bi-directional shifting movement along, in the direction of, the rotational axis 24 between a first position of the translator 56, which corresponds to a first mode of the dynamically controllable clutch (DCC) 12 and a second position which corresponds to a second mode of the dynamically controllable clutch (DCC) 12. When two actuation members or springs 50 are provided, the springs 50 are spaced 180°apart. The first and second modes may be locked, locking element deployed, and unlocked, locking element nondeployed, i.e., freewheeling, modes of the dynamically controllable clutch (DCC) 12. In one example, the translator 56 includes the plate 58 and preferably six bi-directionally movable actuation members or springs 50. Each of the springs 50 has a free end portion adapted to move within its passage 46 and engage one of the locking elements 20 of the dynamically controllable clutch (DCC) 12 for selective, small displacement locking element 20 movements.

The assembly 10 also includes a snap ring 76 in a groove formed in an inner axial surface of the case 60 to hold a bearing 78 at one surface thereof. Another snap ring 80 holds the bearing 78 at an opposite surface against the pocket plate 16—an annular seal 82 seals the bearing 78.

Figures 2, 3:
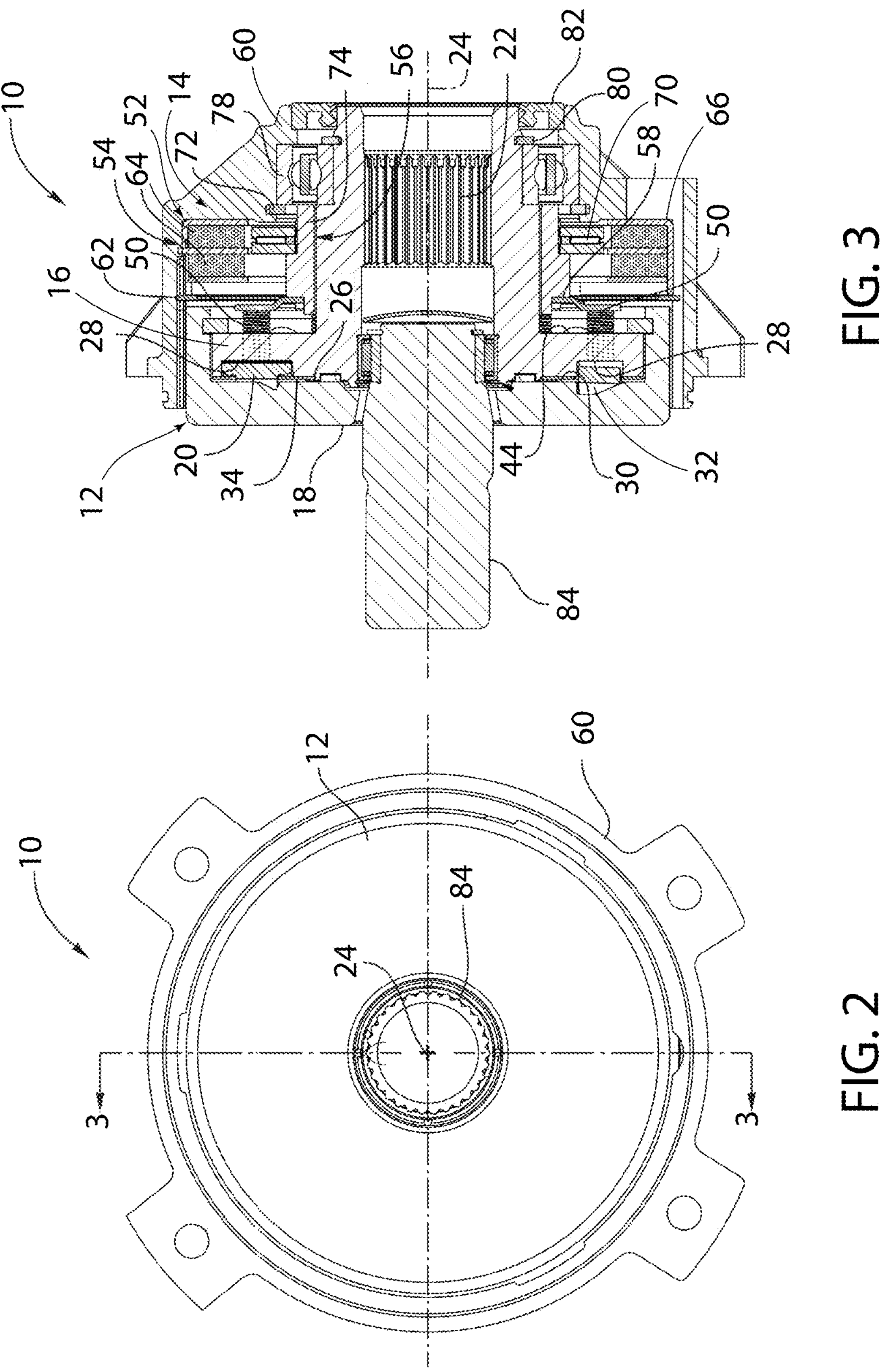
FIG. 2 is an end view of the dynamically controllable clutch (DCC) of FIG. 1.
FIG. 3 is a cross-sectional view of the dynamically controllable clutch (DCC) of FIG. 1 taken along line 3-3.
Figures 4, 5:
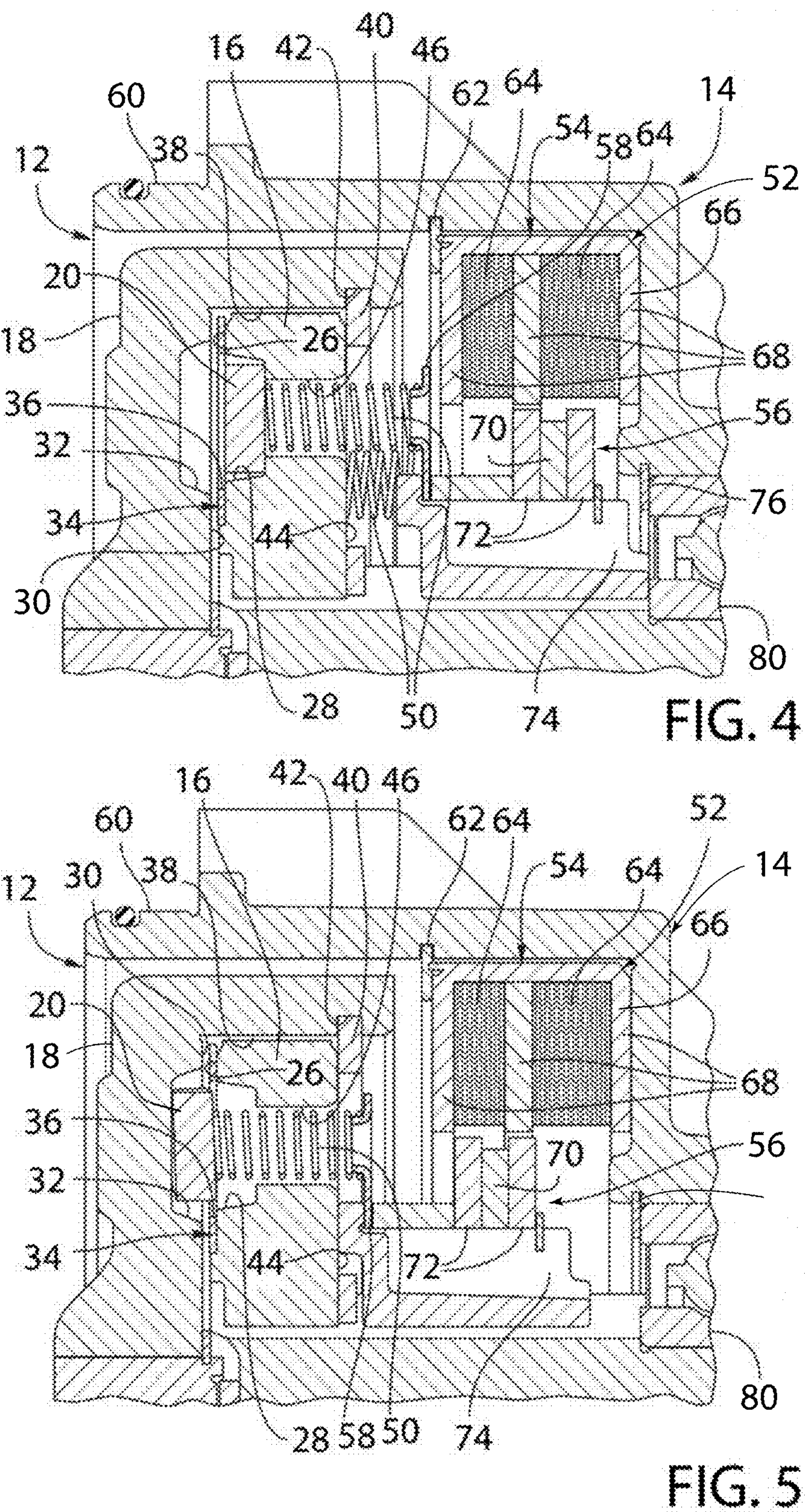
FIG. 4 is a cross-sectional side view, partially broken away, of the DCC with a translator of the linear actuator magnetically latched in the "off" position.
FIG. 5 is a cross-sectional side view, partially broken away, of the DCC with the translator of the linear actuator magnetically latched in the "on" position.

FIGS. 3-5 show the linear actuator 52 controlling the locking elements 20. Depending on the actuation direction, the actuation members or springs 50, in conjunction with the translator 56, act on the locking elements 20 and cause them to pitch up or down. The actuator 14 has an "off" position, with the locking element 20 nondeployed, as shown in FIGS. 3 and 4, and an "on" position, with the locking element 20 deployed, as shown in FIG. 5. The linear actuator 52 switches between the "off" and "on" positions by causing the translator 56 to move laterally between a right-most position, shown in FIGS. 3 and 4, and a left-most position, shown in FIG. 5.

Biasing members (not shown) such as return springs bias the locking elements 20 against a pivotal motion of the locking elements 20 towards their engaged positions. The biasing members apply a compressive force to keep the locking elements 20 in the pockets 28. When the translator 56 moves from "off" to "on," each actuation member or spring 50, contacting a face or surface of its respective locking element 20, overcomes the force of the biasing member or return springs and moves or pivots the locking element 20 outward, past the flat, annular coupling face 26 of the pocket plate 16 whereby the locking element can engage the notch plate 18. The dynamically controllable clutch (DCC) 12 transmits torque in each locked direction of rotation when the locking elements 20 are engaged with notch plate 18. The biasing member or return spring under each locking element 20 is compressed during the engaged state. When commanded "off," the translator 56 moves back toward the "off" position, and biasing members or return springs bias, exert a force on the locking elements 20, overcoming the reduced force of the actuation members or springs 50 and moving the locking elements 20 towards their disengaged positions. Each pocket 28 has an inner recess for receiving its respective biasing spring. The biasing members or return springs create a force, causing the locking elements 20 to pitch downward or disengage. Once a torque reversal occurs, the locking elements 20 can disengage, and the dynamically controllable clutch (DCC) 12 can freewheel.

To change the state from "off" to "on," an electrical current energizes the stator coils 64. One energized stator coil produces a magnetic field that repels the steady state field generated by the permanent magnet, the magnetic annular segment 70, while the other energized stator coil produces a magnetic field that attracts the steady state field generated by the permanent magnet, the magnetic annular segment 70. The combination of repelling and attracting forces caused by the stator coils 64 causes the translator 56 to move.

The repulsive force of one coil 64 and the attraction force of the other coil 64 develop a force exceeding that of the passive magnetic latch holding the translator 56 in the "off" position. The passive magnetic latch is the force of the magnetic annular segment 70 attempting to align with one of the fingers 68 of the ferromagnetic housing 66. For example, the left-most finger 68 in the "on" position, and the right-most finger 68 in the 'off' position. The passive magnetic latch exceeds the spring forces, and the translator 56 passively latches into one of the engaged positions, "on" or "off."

As shown in FIG. 5, the translator hub or carriage 74 contacts the opposite face 44 of the pocket plate 16 and prevents complete alignment of the magnetic annular segment 70 and the left-most stator steel plate or finger 68 of the ferromagnetic housing 66, which results in a biasing force that holds the translator 56 in the "on" position. The translator 56 is magnetically latched in the "on" position.

To disengage the dynamically controllable clutch (DCC) 12, an electrical current is applied to the stator coils 64. The energized stator coils 64 produce magnetic fields that move the translator 56 from the "on" position into contact with the bearing 78, which functions as an "off" stop in a similar manner described above. The "off" mechanical stop prevents complete alignment of the permanent magnet, the magnetic annular segment 70, and the right-most stator steel plate or finger 68 of the ferromagnetic housing 66, resulting in the translator 56 remaining magnetically latched in the "off" position.

The coupling assembly 10 includes a permanent magnet latch mechanism that holds the assembly 10 in its "on" position and its "off" position without using any energy. The magnetic latch mechanism of the assembly 10 allows for lower energy usage, which means better vehicle efficiencies and less damage/wear to the components.

Figure 6:
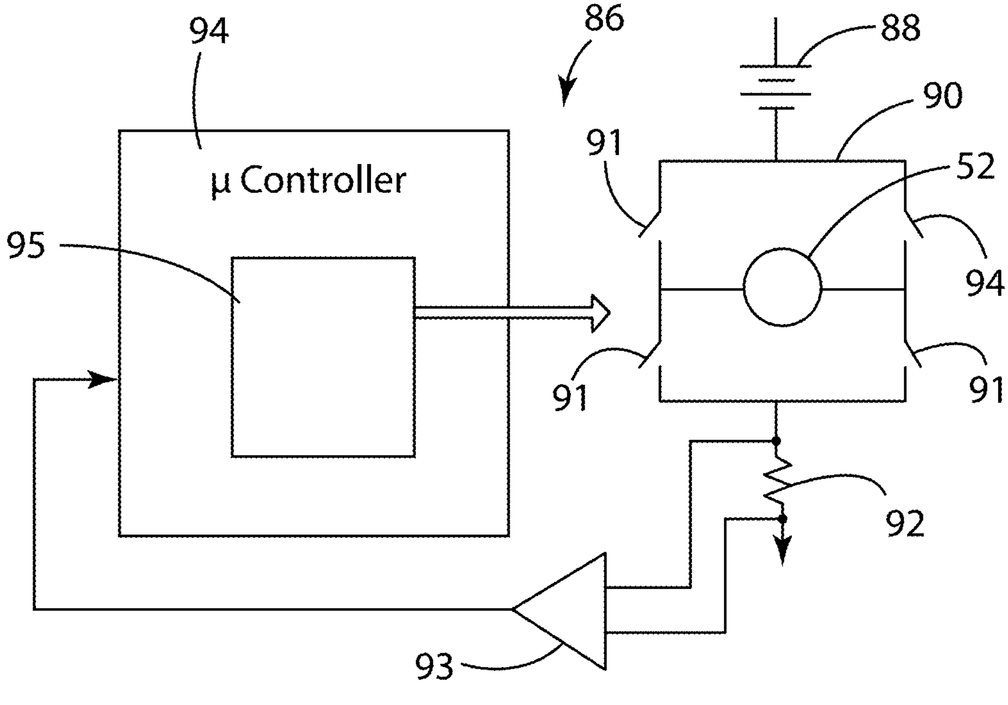
FIG. 6 is a schematic representation of an exemplary embodiment of an assembly having an actuation circuit according to the invention.

FIG. 6 illustrates a schematic diagram of the controller assembly, generally seen at 86, supplying power to and controlling operation of the actuator 52. The controller assembly 86 includes a power source, for example, a battery 88, a driver bridge 90, including switches 91, a sensing resistor 92, an amplifier 93, and a microcontroller 94, including an analog-to-digital converter 95. As shown, current feedback from the actuator 52 is amplified and fed into the analog-to-digital converter 95 input of the microcontroller 94. In one example, a PID (Proportional, Integral, Derivative) loop regulates the coil current of the coils 64 of the actuator 52 by modulating the driver bridge 90 and detecting the motion of the actuator 52. In another example, the current is measured against an open loop value.

Figure 7:
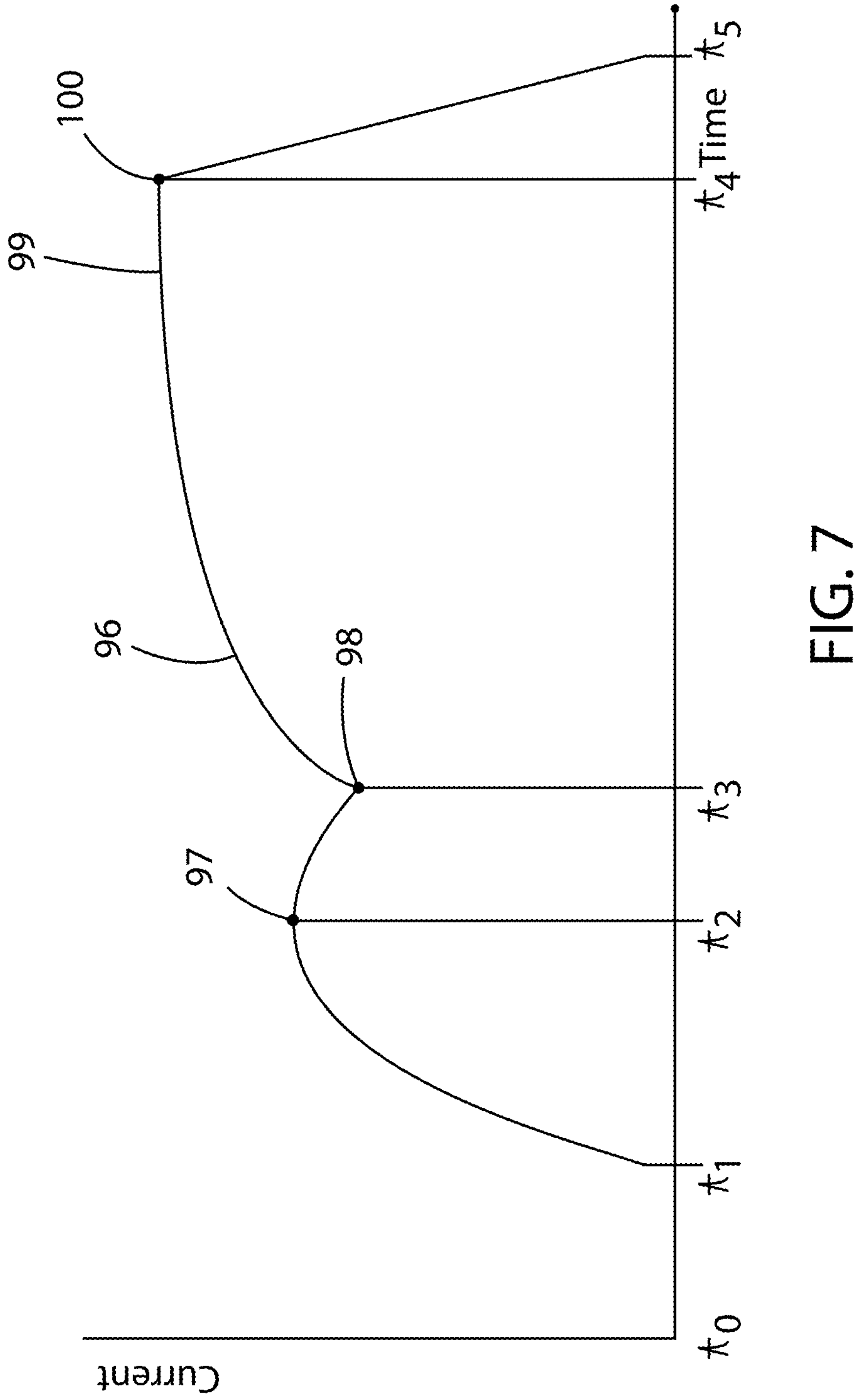
FIG. 7 is a graphic representation of the current flow in an actuator coil associated with translator movement.

FIG. 7 illustrates a graph of current over time, as indicated by current curve 96, as it relates to translator 56 motion. The initial state or beginning of the actuation cycle is at $t_0$. At $t_1$, a voltage application causes a current increase in the coils 64, which builds an electromagnetic force. When the electromagnetic force becomes strong enough, it overcomes the magnetic latch holding the translator 56. As the magnetic field continues to build, there is a net positive electromotive force on the translator 56, so it begins to move at $t_2$. FIG. 7 shows the initial current peak 97, the start of translator 56 movement. The motion of the translator induces a back electromotive force or back EMF into the coil, causing a reduction in current. The current curve 96, drops to the current valley 98 at $t_3$. The current valley 98 indicates that the translator 56 has stopped moving, wherein continued voltage application results in the current rising from the current valley 98 until it reaches a steady state 99.

The translator 56 may move slightly before the initial current peak 97 at $t_2$ is observed, i.e., sufficient translator 56 motion is needed to induce the back EMF, which resists the current. When the translator reaches the end of travel, the current 96 reaches the current valley 98, indicating an end of translator 56 motion. Once motion ends, the current 96 increases until a steady state 99 of current is achieved. At time $t_4$, point 100, the voltage is removed, and the current curve 96 shows the current flow decreasing to the initial state at $t_5$. The system then resets or returns to $t_0$ for the next actuation cycle.

FIG. 8 illustrates one example where the voltage is applied, actuator motion is detected, and the current level is maintained for an additional 10 ms after reaching a steady state or stable current value. Trace 114 is the actuator current in analog-to-digital converter counts measured by the microcontroller 94, Trace 116 is the Derivative term from PID control, and Trace 118 is the Actuator Operation State. Trace 114 and Trace 116 use the vertical or Y-axis scale on the left side of the graph. Trace 118 trace uses the vertical or Y-axis scale on the right side of the graph. The X-axis of the graph is in 250 microseconds (μsec) time increments, wherein the total time along the X-axis is 30 ms. FIG. 8 shows the process starts; the actuation cycle begins with no voltage applied—Operation State 0. Voltage is applied, and the current to the actuator—actuator current, shown by Trace 114, begins to flow and steadily increases—Operation State 1. A controller continuously monitors the actuator current flow. The actuator current rises and slopes upward toward an initial peak, as shown by point 120 on Trace 114. The actuator current continues to rise until reaching the initial current peak 120—Operation State 2. The actuator current flow, Trace 114, reaches the initial current peak 120 and begins to decrease. As shown, the actuator current flow, Trace 114, reaches a zero slope at the initial current peak 120 and then begins to drop or slope downward. At the start of Operation State 2, the slope of the actuator current flow, Trace 114, may be slightly positive or 0; it is not necessarily negative yet.

The actuator current flow, Trace 114, drops or slopes downward due to a counter-electromotive force—sometimes referred to as back EMF. Movement of the translator 56 induces back EMF in the coils 64 of the stator 54. The current in the coils 64 of the stator 54 provided by a voltage source, or battery 88, is opposed by the back electromagnetic force or back EMF. Monitoring the profile current and the effect of the back EMF enables the determination of completed translator movement, deployment of the locking element, and controlling torque transfer or transmission between the relative components.

As illustrated in FIG. 8, during Operation State 2, the actuator current flow, Trace 114, continues to fall or slope downward until it reaches the current valley 122, at which time the translator stops moving, the end of translator 56 motion. The actuator current flow, Trace 114, increases once the translator 56 stops moving, marking the beginning of Operation State 3.

In Operation State 3, the actuator current flow, Trace 114, continues to increase and reaches or obtains a steady state or stable current level 124. The steady state or stable current level 124 marks the beginning of Operation State 4, which monitors the actuator current flow. A timer starts when the actuator current flow, Trace 114, reaches a steady state or stable current level 124. Operation State 4 ends when the current level reaches and remains at the steady state or stable current level for a predetermined time, for example, 10 ms. The voltage is removed, and the actuator current flow, Trace 114, decreases—Operation State 5, to the initial state—Operation State 0. The system then resets or returns for the next actuation cycle.

FIG. 8 illustrates one example of current applied to an actuator to move the actuator in one direction, whereby the actuator acts on a locking element. In the example shown, voltage is applied, actuator motion is detected, and actuator current level is maintained for an additional 10 ms after reaching a steady state or stable current value. The translator 56 has moved to its final/deployed position, illustrated by the current drop or current valley 122 shown in the actuator current flow, Trace 114. As illustrated, the actuator current flow, Trace 114, rises to an initial current peak 120, after which it falls off until reaching a current valley 122—the current valley 122 coincides with the actuator's end of motion. The current then rises until it reaches a steady state or stable current level 124 for a predetermined period, for example, an additional 10 ms. After the additional predetermined period, the current ramps down 126. As illustrated, the current pulse duration is less than 30 ms.

The current system and method detect the motion of the translator 56 based on the current drop shown in the actuator current flow, Trace 114, rather than applying current for a predetermined period, for example, a 150 ms duration. The system and method also control torque application based on actuator motion, in one example, at the end of actuator motion instead of a predetermined or set period. In one example, torque can be applied once the end of the motion of the actuator is detected—upon the current reaching the current valley. In another example, the torque is applied after 30 ms, and includes an additional period, for example, 10 ms, for the current to reach a steady state or stable current level. In both cases, drive torque is applied based on current rather than waiting to apply drive torque after the expiration of a predetermined period, for example, 150 ms. The foregoing system and method reduce the time for torque application and the voltage applied to the actuator. Voltage is applied to the actuator based on actuator movement, not time.

FIG. 9 is one example of a case when actuator motion is not detected. Motion may not be detected when the translator 56 does not move due to some binding/blockage/malfunction. The lack of translator 56 motion means the current drop from back EMF is not detected, the actuator current flow, Trace 114, does not fall off and reach the current valley 122, see FIG. 8, and the microcontroller 94 continues to apply voltage for a predetermined duration, for example, 150 ms. The voltage is turned off at the end of the predetermined duration of 150 ms. Because no motion was detected, the microcontroller 94 continued to apply voltage for the entire 150 ms duration. The microcontroller 94 could alert other systems that no motion was detected.

The actuator 52 also acts on and moves the translator 56 in the opposite direction and correspondingly moves the locking element 20 from a deployed to a nondeployed position. Applying an opposite polarity voltage moves the translator 56 in the opposite direction; however, the actuator current flow, Trace 114, is the same because it is in analog-to-digital converter counts measured by the microcontroller 94. In addition, the system and method could be used with actuators with three or more discrete translator positions.

FIG. 10 illustrates an advantage of the disclosed embodiment relating to shift time. Shift time includes actuation time and time to torque (TTT). Actuation time is based on the detection of the end of the motion of the actuator, for example, upon the actuator current reaching the current valley. Time to torque (TTT) is the time it takes to transfer full torque from the drive member to the driven member. The shift time is the actuation time plus the TTT, the time to apply full torque from the drive member to the driven member. As explained, existing open-loop systems include, for example, a preselected actuation time of 150 ms. Once the actuation time is completed, for example, after the expiration of the 150 ms actuation time period, torque may be applied from the drive element to the driven element, from the pocket plate through the locking element or strut to the notch plate. Because the actuation time is fixed at 150 ms, changes in the shift time only result from a change in the time to torque (TTT).

Monitoring the current profile, including the rise and drop in the current applied to the actuator 52, provides motion state information, including the start and end of the actuator 52, particularly the translator 56, motion. Because the actuator 52, in particular the translator 56, acts on the strut or locking element 20 of the coupling assembly 10, knowing the position of the actuator 52 provides information as to the position of the strut or locking element 20. For example, if the strut or locking element 20 is in a nondeployed position, and current is applied to the actuator 52, the actuator begins or starts motion of the translator 56, which moves the strut or locking element 20 from the pocket 28 outward toward a deployed position. When the translator 56 reaches the end of motion, the strut or locking element 20 is positioned in the deployed position. Upon the translator 56 reaching the end of motion, the current in the actuator 52 begins to rise. After achieving a stable current for a particular amount of time, torque can be applied, and the current can be ramped down. The current need not reach 0 before torque application.

Torque application is based on actuation, translator 56 movements, not a predetermined period. As shown in FIG. 10, after actuation, torque can be applied over different periods to achieve different shift characteristics or profiles.

One example of operating a vehicle, according to the present invention, includes providing a selectable one-way clutch and using the selectable one-way clutch to transfer torque from a drive member to a driven member. The method uses an actuator to move the locking element of the selectable one-way clutch between a nondeployed, non-torque transmitting position and a deployed, torque transmitting position. In the torque transmitting position, the selectable one-way clutch transfers torque from the drive member to the driven member. Because a successful shift is based on detected current levels, the method and system control torque applications from the drive member to the driven member after the shift occurs, not after a predetermined time. Existing open-loop systems included a fixed actuation time, for example, 150 ms, based on an unfavorable shift condition—for example, a low temperature or a low voltage, plus a design factor. In existing systems, torque is applied after the fixed actuation time expires. However, the inventive closed loop system provides a shorter time, for example, 30 ms, after which torque can be applied, reducing torque application time by 120 ms.

The method and system also reduce energy consumption as the voltage to the actuator ramps down after a period of stable current once the end of the motion of the actuator, the end of translator motion is detected.

Detecting the end of translator motion enables a faster time to torque or a smoother time to torque, a less harsh shift event, in the original time. The existing open-loop system used a predetermined, empirically selected time to allow the actuator to move and deploy the locking element or strut before torque was applied. The predetermined time was selected to provide a time cushion, buffer, or margin before applying torque because the locking element or strut is deployed before torque is applied. The inventive system and method provide the opportunity to reclaim time and apply torque based on translator motion rather than wait for the expiration of the predetermined time.

Figure 11:
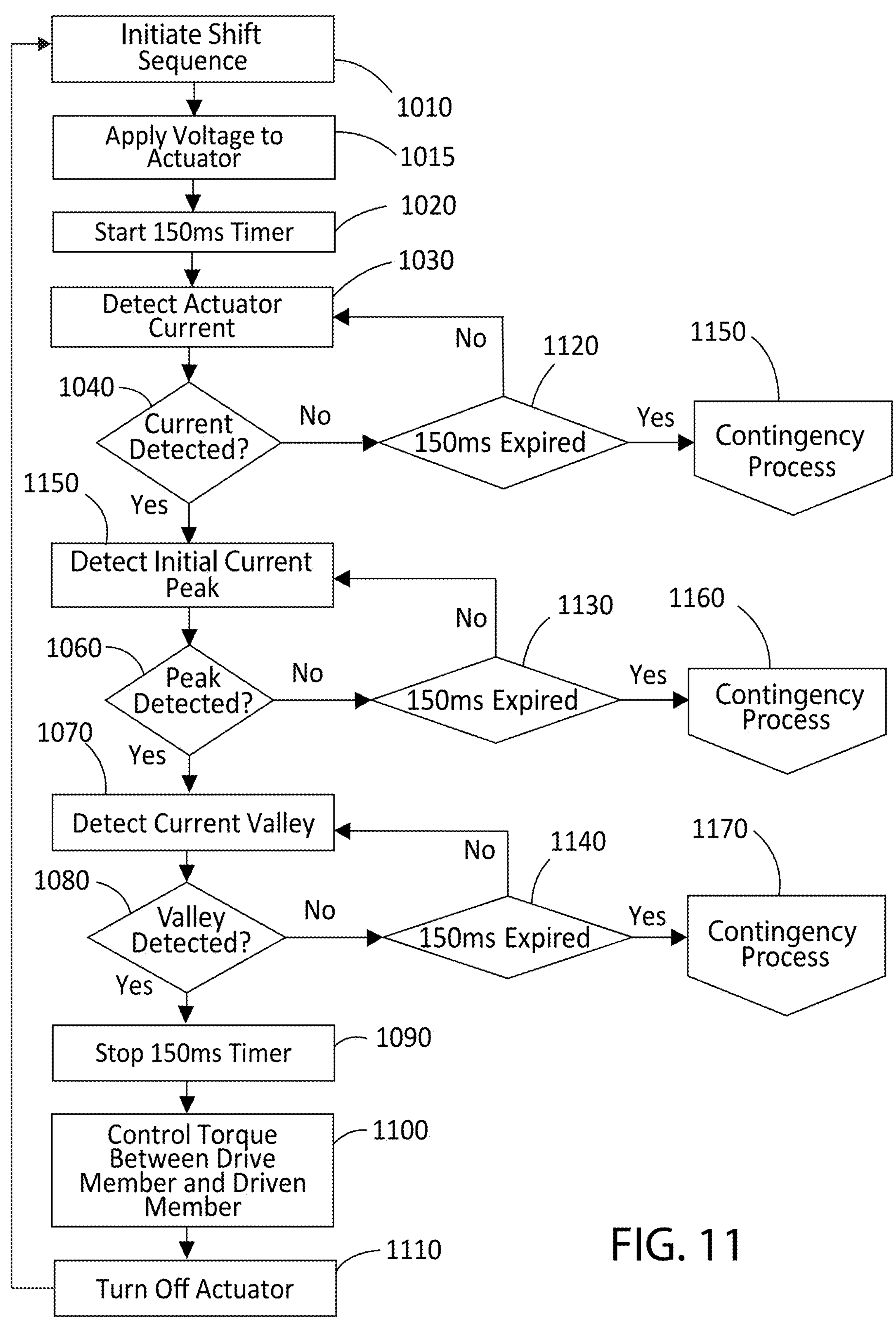
FIG. 11 is a flowchart of one method according to the invention.

FIG. 11 illustrates one example of a system and method for torque application or controlling torque based on actuator movement. Similar or identical elements are given consistent reference numerals throughout the figures in each of the following embodiments and indicate corresponding parts.

In Step 1010, the method starts with initiating a shift sequence. In one example, based on a vehicle parameter or operator selection, a controller initiates a shift from a first forward gear to a second forward gear or a low-range gear train to a high-range gear train. In Step 1015, after, or contemporaneously with, initiating the shift sequence, voltage is applied to the actuator, causing or resulting in current flow through the actuator and movement of the actuator translator, which correspondingly acts on the locking element to position the locking element in a deployed or nondeployed position, enabling torque control between the drive member and the driven member. The system and method include a timer, in one example, a maximum actuation duration timer. In Step 1020, the timer starts after applying the voltage to the actuator. The timer is set to run for a predetermined period of 150 ms. The timer length could be longer or shorter, for example, 100 ms or 200 ms, depending on system conditions, operating components, and actuation requirements. After applying voltage to the actuator in Step 1015, it is presumed that current flows through the actuator. In Step 1030, the system and method detect actuator current in the actuator after voltage application in Step 1015. Detect, as used herein, means to look for, discover, or ascertain the existence or presence of something. For example, the process of detecting actuator current may be based on a predetermined level of the current flow or a rate of increase of current flow.

Step 1040 decides, based on information found in Step 1030, if the system and method proceed to either Step 1050 or Step 1120. In Step 1040, if actuator current is detected in Step 1030, then the system and method proceed to Step 1050. In Step 1040, if actuator current has not been detected in Step 1030, then the system and method proceed to Step 1120. Step 1120 decides if the 150 ms timer, which continues to run from its start in Step 1020, has expired. In Step 1120, if the timer has not expired, the system and method return to Step 1030. In Step 1120, if the 150 ms timer period has expired, the system and method proceed to Step 1150. In Step 1150, the system and method undertake a contingency process. The contingency process may include, and is not limited to, reinitiating the shift sequence, returning to Step 1010; providing a fault indication, for example, an indicator light or warning; placing the system in a limited or reduced mode, for example, a limited torque application or limp mode; initiating an opposite shift sequence, for example instead of cycling the actuator to position the locking element in a deployed mode, cycling the actuator to position the locking element in a nondeployed mode to determine actuator, translator motion, in the opposite direction; and providing a fault indication and querying vehicle systems to ascertain if torque is transmitted between the drive and driven element. The foregoing is not limiting. Other contingency processes may be used depending upon the particular use of the system and method, for example, in a vehicle drive train or power system.

The system and method monitor the current flowing through the actuator and, in Step 1050, detect an initial current peak 97, FIG. 7, based on the slope of the actuator current. In one example, the initial current peak is detected based on a change of slope in the current curve. Other examples of detecting the initial current peak include using a predetermined set value or an initial current peak threshold. FIG. 7 shows the actuator current 96. Initially, as voltage is applied, the actuator current slope is positive, increasing until it reaches a peak. At the peak, the slope of the actuator current is zero. After that, the actuator current decreases, and the slope is negative. The actuator current begins to decrease and follows a negative slope because the translator motion induces back EMF into the coil, causing a reduction in current. The initial current peak of the actuator current may be associated with the start of the translator motion.

Step 1060 decides, based on information found in Step 1050, if the system and method proceed to either Step 1070 or Step 1130. In Step 1060, if an initial current peak is detected in Step 1050, then the system and method proceed to Step 1070. In Step 1060, if an initial current peak is not detected in Step 1050, then the system and method proceed to Step 1130. Step 1130 decides if the 150 ms timer, which continues to run from its start in Step 1020, has expired. In Step 1130, if the 150 ms timer has not expired, the system and method return to Step 1050. In Step 1130, if the 150 ms timer period has expired, the system and method proceed to Step 1160. In Step 1160, the system and method undertake a contingency process. The contingency process of Step 1160, similar to that of Step 1150, may include and is not limited to reinitiating the shift sequence, returning to Step 1010, providing a fault indication, for example, an indicator light or warning; placing the system in a limited or reduced mode, for example, a limited torque application or limp mode; initiating an opposite shift sequence, for example instead of cycling the actuator to position the locking element in a deployed mode, cycling the actuator to position the locking element in a nondeployed mode to determine actuator, translator motion, in the opposite direction; and providing a fault indication and querying vehicle systems to ascertain if torque is being transmitted between the drive and driven element. The foregoing is not limiting. Other contingency processes may be used depending upon the particular use of the system and method, for example, in a vehicle drive train or power system.

The system and method monitor the current flowing through the actuator and, in Step 1070, detect a current valley 98, FIG. 7, the dip or low point of the actuator current. In one example, the current valley is detected based on the slope of the actuator current. Other examples of detecting the current valley include using a predetermined set value or current valley threshold. Because the motion of the translator induces a back EMF into the coil, causing a reduction or drop in actuator current, the actuator current continues to decrease, based on the movement of the translator, following a negative slope until the translator stops moving, reaches an end of travel, and the current has a zero slope. After the translator stops moving, the actuator current increases until a steady state is achieved. The current valley 98, FIG. 7, is the zero slope of the actuator current between the current negative slope and the current positive slope. The end of motion of the translator is detected based on a drop in actuator current. The current valley 98 is associated with the actuator's end of motion, the end of actuator travel.

Step 1080 decides, based on information found in Step 1070, if the system and method proceed to either Step 1090 or Step 1140. In Step 1080, if a current valley 98 is detected, then the system and method proceed to Step 1090. In Step 1080, if a current valley 98 is not detected, then the system and method proceed to Step 1140. Step 1140 decides if the 150 ms timer, which continues to run from its start in Step 1020, has expired. In Step 1140, if the timer has not expired, the system and method return to Step 1070. In Step 1140, if the 150 ms timer has expired, the system and method proceed to Step 1170. In Step 1170, the system and method undertake a contingency process. The contingency process of Step 1170, similar to that of Steps 1150, 1160, may include, and is not limited to, reinitiating the shift sequence; returning to Step 1010, providing a fault indication, for example, an indicator light or warning; placing the system in a limited or reduced mode, for example, a limited torque application or limp mode; initiating an opposite shift sequence, for example instead of cycling the actuator to position the locking element in a deployed mode, cycling the actuator to position the locking element in a nondeployed mode to determine actuator, translator motion, in the opposite direction; and providing a fault indication and querying vehicle systems to ascertain if torque is being transmitted between the drive and driven element. The foregoing is not limiting. Other contingency processes may be used depending upon the particular use of the system and method, for example, in a vehicle drive train or power system.

Step 1090 stops the 150 ms timer. The timer is set to run for and expire at the end of the 150 ms time. However, Step 1090 stops the timer once the current valley is detected. For example, if the current valley is detected after 20 ms, the timer is stopped. The method then progresses to Step 1100. Step 1100 includes controlling torque application from the drive member to the driven member. A controller or vehicle control unit may, based on the detection of the shift—deployment or nondeployment of the locking element, control or manage the torque between the respective elements, for example, the pocket plate and the notch plate. For example, the control torque between the drive and driven member includes, but is not limited to, applying torque to the drive member, which is then transferred to the driven member. In most cases, in a drive mode, the torque transfers from the drive member attached to a power source, such as an electric motor, to a driven member, such as a gear system or drive wheel. In the case of an electric vehicle, torque may be applied in both directions of electric motor rotation. For example, the vehicle moves forward in one direction of rotation and backward in the opposite direction. In addition, when operating in a regeneration mode, the gear system or drive wheel may operate as the drive member, transferring torque to a driven member, for example, the electric motor.

The system and method may include additional steps upon detecting the end of the translator motion based on the detection of the current valley. Step 1110 includes turning off the actuator, for example, removing voltage from the actuator. FIG. 11 shows the system and method then return to the initiate shift sequence, Step 1110, and wait to initiate a new shift sequence.

Actuator motion is viewed in both ways or directions, including moving the locking element from a deployed, engaged position to a nondeployed or disengaged position. In one example, in the first or beginning actuator position, the locking element is in a nondeployed or disengaged position, and upon moving to the second or ending actuator position, the actuator moves the locking element to a deployed or engaged position. In the deployed or engaged position, the locking element couples the drive member to the driven member, enabling torque application or transfer between the drive and driven members. Applying torque to the driven member before deploying the locking element of the one-way clutch may cause a shock in the vehicle powertrain components felt by the occupant or operator. It may also damage components of the clutch. A delay in applying torque to the driven member after the locking element of the one-way clutch is deployed results in increased shift times. For example, basing the torque application on a predetermined actuation time potentially delays shift times and torque application and reduces vehicle performance. Torque can be applied from the drive member to the driven member based on the actuator end of motion determination, whereby the drive member transmits torque through the selectable one-way clutch to the driven member. The inventive system and method result in shorter overall shift times.

While Step 1090, stopping the 150 ms timer, is shown before Step 1100, controlling torque between the drive member and driven member, this is for exemplary purposes only. Step 1100, controlling torque between the drive member and driven member, may occur immediately after Step 1080, with Step 1090 and Step 1110 taking place subsequently or concurrently.

The Time to Torque shown in FIG. 10 may vary to alter the shift parameters and feel. In one example, torque is applied slowly to facilitate a smoother shift. In another example, the torque is applied rapidly, resulting in a faster albeit harsher shift. The foregoing enables torque control once the translator has completed motion, deploying the locking element or strut.

Figure 12:
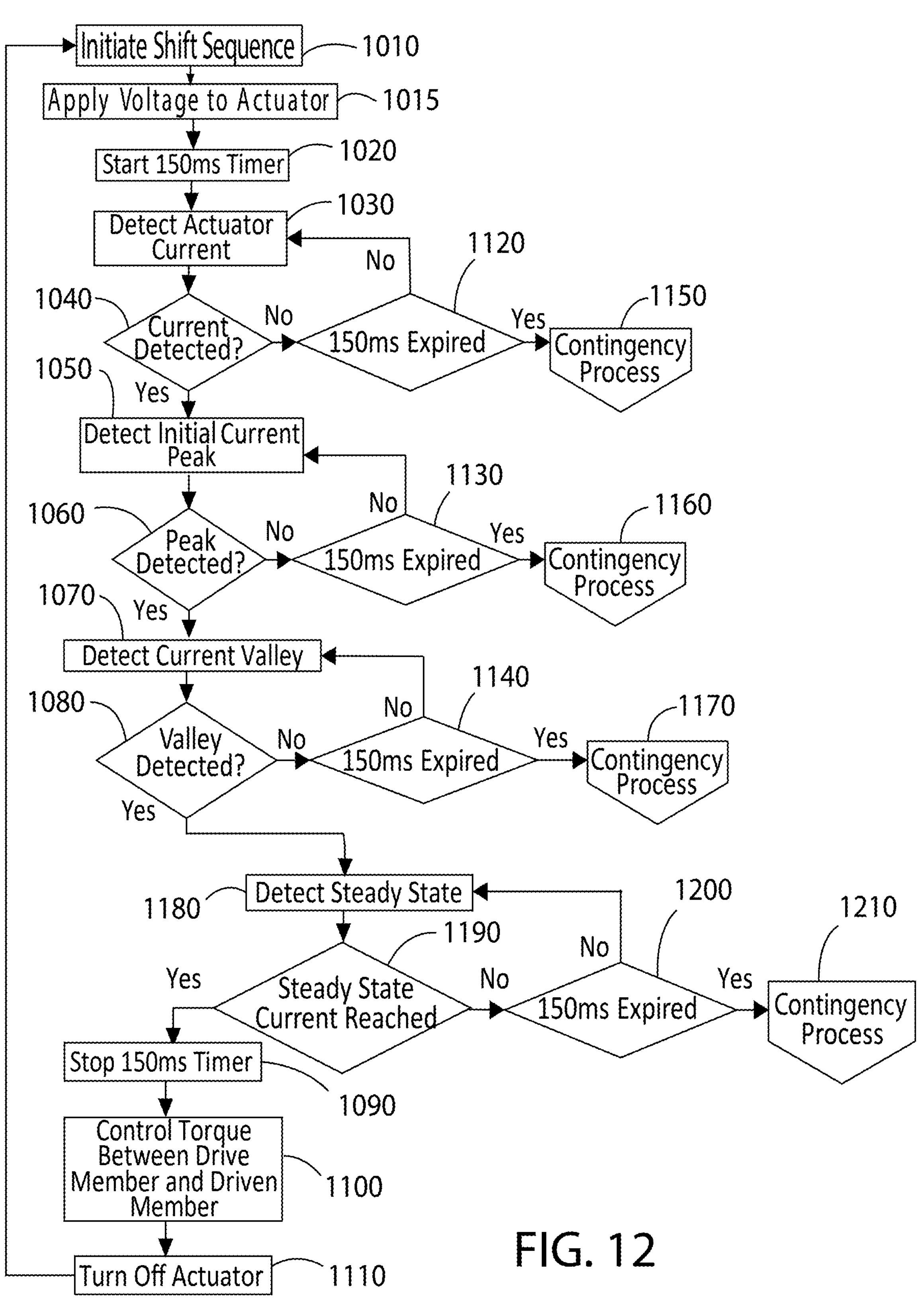
FIG. 12 is a flowchart of another method according to the invention.

FIG. 12 illustrates an additional example of the system and method, including Steps 1180 through 1210. In Step 1180, the system and method detect a steady state 99 of current, FIG. 7, flowing through the actuator for a predetermined time. The process of detecting a steady state of current flowing through the actuator may be based on a predetermined level of current flow, the rate of increase or decrease of the level of current flow, or a current flow slope approximating zero. Step 1190 decides, based on the information found in Step 1180, if the system and method proceed to either Step 1090 or Step 1200. In Step 1190, if a steady state current is detected in Step 1180, then the system and method proceed to Step 1090. In Step 1190, if a steady state current is not detected in Step 1180, then the system and method proceed to Step 1200. Step 1200 decides if the 150 ms timer, which continues to run from its start in Step 1020, has expired. In Step 1200, if the timer has not expired, the system and method return to Step 1180. In Step 1200, if the 150 ms timer has expired, the system and method proceed to Step 1210. In Step 1210, the system and method undertake a contingency process. The contingency process of Step 1210, similar to that of Steps 1150, 1160, and 1170, may include and is not limited to reinitiating the shift sequence, returning to Step 1010, providing a fault indication, for example, an indicator light or warning; placing the system in a limited or reduced mode, for example, a limited torque application or limp mode; initiating an opposite shift sequence, for example instead of cycling the actuator to position the locking element in a deployed mode, cycling the actuator to position the locking element in a nondeployed mode to determine actuator, translator motion, in the opposite direction; and providing a fault indication and querying vehicle systems to ascertain if torque is being transmitted between the drive and driven element. The foregoing is not limiting. Other contingency processes may be used depending upon the particular use of the system and method, for example, in a vehicle drive train or power system.

Figure 13:
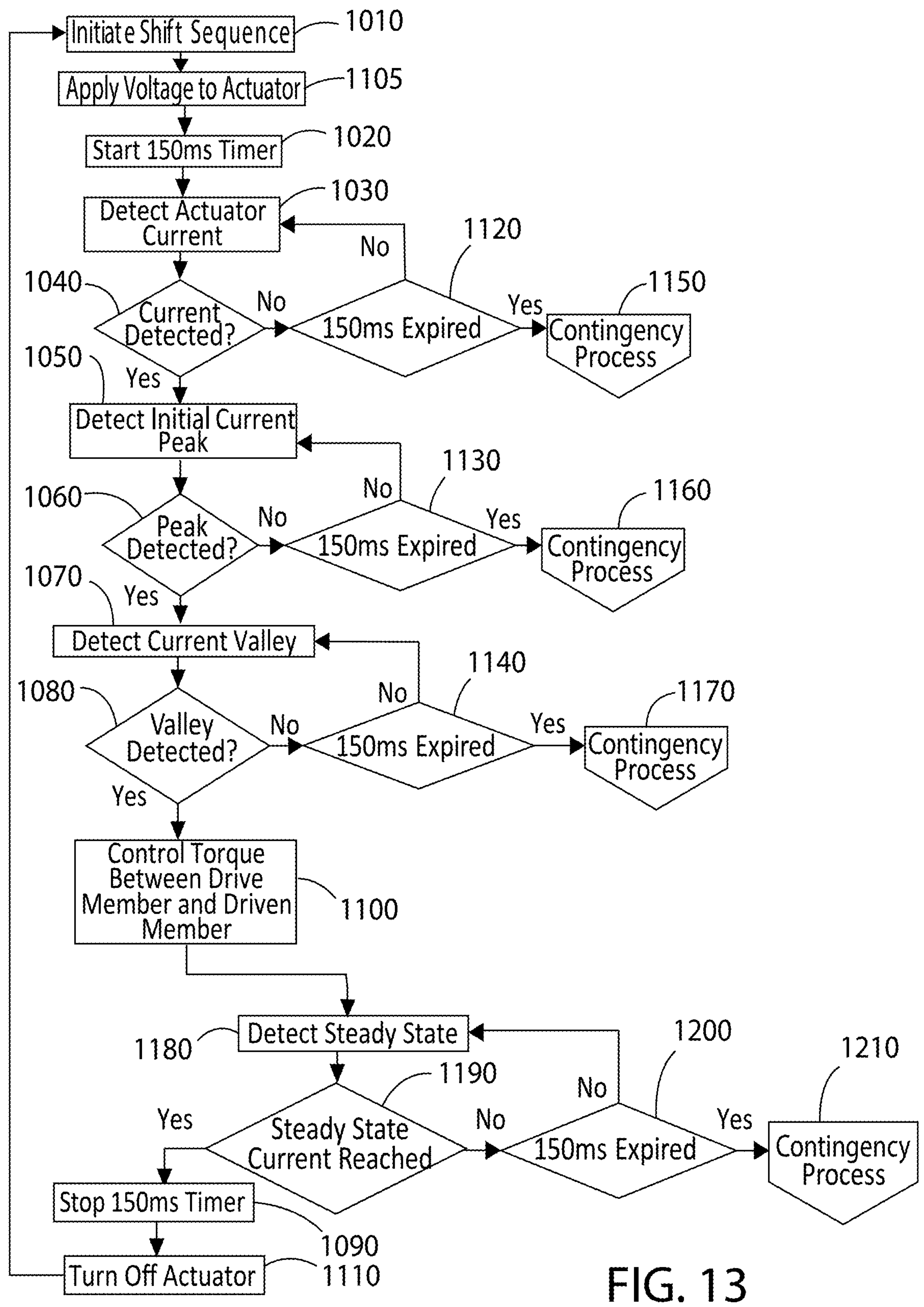
FIG. 13 is a flowchart of an additional method according to the invention.

FIG. 13 illustrates another example of the system and method wherein, in Step 1080, if a current valley 98 is detected, then the system and method proceed to Step 1100, controlling the torque between the drive member and the driven member. After Step 1100, the system and method proceed to Step 1180 to detect a steady state current. In Step 1190, if a steady state current is detected in Step 1180, then the system and method proceed to Step 1090. Another example of the system and method includes, in Step 1080, if a current valley 98 is detected, then the system and method proceed to one or more of the remaining Steps 1090, 1100, 1110, 1190, 1200, 1210, either subsequently or concurrently. For example, not all the steps must occur in a set or sequential order; some may operate concurrently. In one example, in Step 1080, if a current valley 98 is detected, then the system and method proceed concurrently to one or all of Steps 1100, 1180, 1090, and 1110. In another example, in Step 1190, if a steady state current is detected in Step 1180, then the system and method proceed concurrently to one or both of Steps 1090 and 1110, stopping the 150 ms timer and turning off the actuator.

Figure 14:
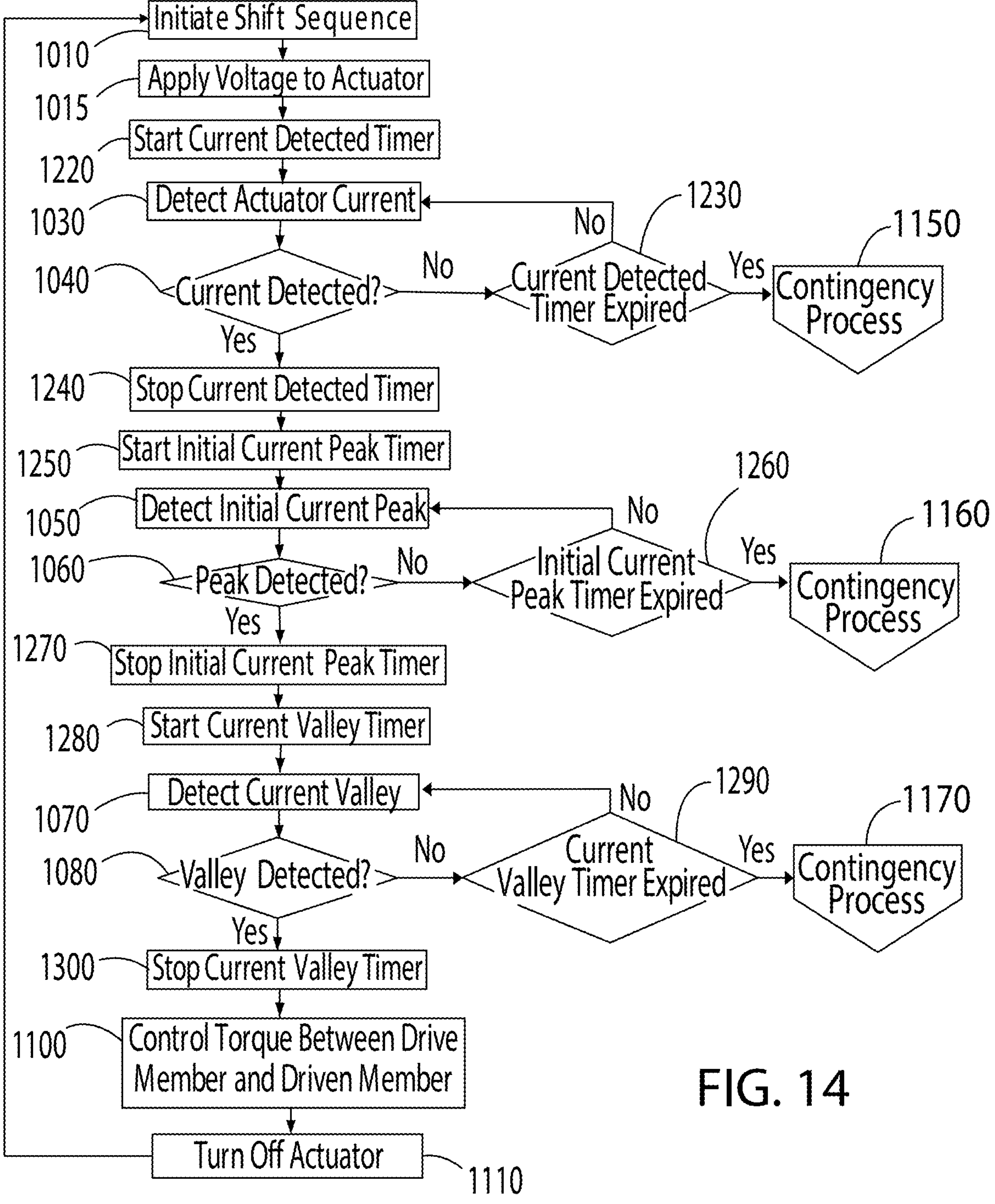
FIG. 14 is a flowchart of another additional method according to the invention.

FIG. 14 illustrates a further example of the system and method, including separate or individual timers associated with Step 1030, detecting actuator current; Step 1050, detecting the initial current peak; and Step 1070, detecting the current valley. Instead of the system and method using a maximum actuation duration timer, which in Step 1020 starts after applying the voltage to the actuator, the system and method may include multiple timers or restart a single timer. For example, the system and method may include a current detected timer that expires after a predetermined period. Step 1220 starts the current detected timer, and Step 1240 stops the current detected timer. After Step 1220, in Step 1030, the system and method detect actuator current in the actuator after applying voltage in Step 1015. Step 1040 decides, based on information found in Step 1030, if the system and method proceed to either Step 1230 or Step 1240. In Step 1040, if actuator current is detected in Step 1030, then the system and method proceed to Step 1240. In Step 1040, if actuator current has not been detected in Step 1030, then the system and method proceed to Step 1230. Step 1230 decides if the current detected timer, which continues to run from its start in Step 1220, has expired. In Step 1230, if the timer has not expired, the system and method return to Step 1030. In Step 1230, if the current detected timer has expired, the system and method proceed to Step 1150. In Step 1150, the system and method undertake a contingency process. The current detected timer can be set to a predetermined time limit, for example, 1-5 ms. Other periods, for example, 1-15 ms, are also contemplated. Similar to the current detected timer, the system and method may include initial peak current and current valley timers. After Step 1240, in Step 1250, the initial current peak timer starts, and in Step 1270, the initial current peak timer stops. Step 1060 decides, based on information found in Step 1050, if the system and method proceed to either Step 1270 or Step 1260. In Step 1060, if an initial current peak is detected in Step 1050, then the system and method proceed to Step 1270. In Step 1060, if an initial current peak is not detected in Step 1050, then the system and method proceed to Step 1260. Step 1260 decides if the initial current peak timer, which continues to run from its start in Step 1250, has expired. In Step 1260, if the initial current peak timer has not expired, the system and method return to Step 1050. In Step 1260, if the initial current peak timer has expired, the system and method proceed to Step 1160. In Step 1160, the system and method undertake a contingency process. The system and method operate similarly to the current valley timer. Step 1280 starts the current valley timer, and Step 1300 stops the current valley timer. Step 1080 decides, based on information found in Step 1070, if the system and method proceed to either Step 1290 or Step 1300. In Step 1080, if a current valley 98 is detected, then the system and method proceed to Step 1300. In Step 1080, if a current valley 98 is not detected, then the system and method proceed to Step 1290. Step 1290 decides if the current valley timer, which continues to run from its start in Step 1280, has expired. In Step 1290, if the timer has not expired, the system and method return to Step 1070. In Step 1290, if the current valley timer has expired, the system and method proceed to Step 1170. In Step 1170, the system and method undertake a contingency process. The separate or individual timers provide a system and method to determine whether necessary current values are detected and move to the various contingency processes before the end of the 150 ms time. A single timer may be used for each Step 1220, 1250, and 1280. For example, after the timer is stopped in Step 1240, it can be reset and used for Step 1250 and Step 1280.

Figure 15:
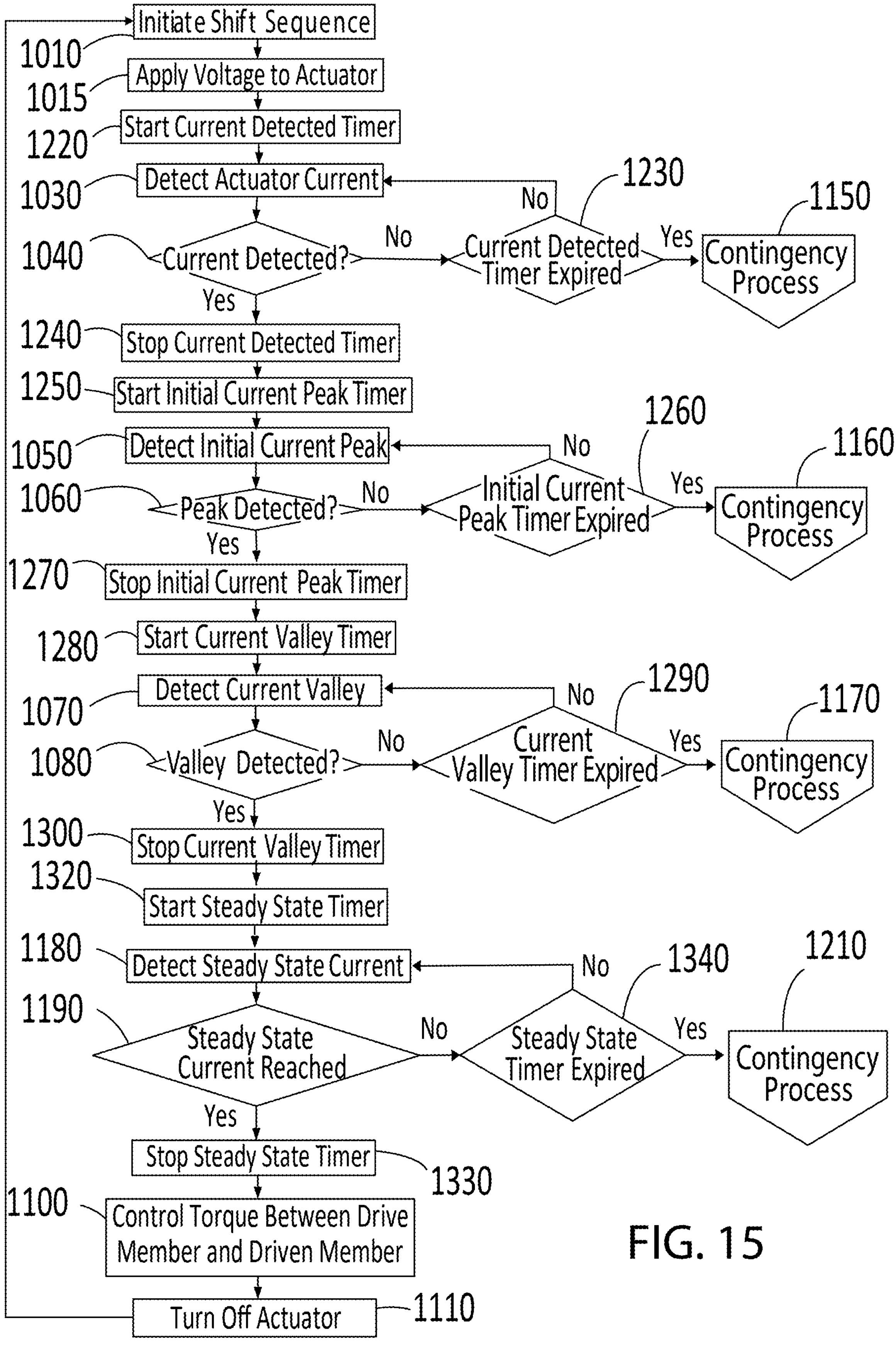
FIG. 15 is a flowchart of another yet additional method according to the invention.

FIG. 15 is another example of a system and method, including a steady state timer. Step 1320 starts the steady state timer, and Step 1330 stops the steady state timer. Step 1190 decides, based on the information found in Step 1180, if the system and method proceed to either Step 1330 or Step 1340. In Step 1190, if a steady state current is detected in Step 1180, then the system and method proceed to Step 1330. In Step 1190, if a steady state current is not detected in Step 1180, then the system and method proceed to Step 1340. Step 1340 decides if the steady state timer, which continues to run from its start in Step 1320, has expired. In Step 1340, if the steady state timer has not expired, the system and method return to Step 1180. In Step 1340, if the steady state timer has expired, the system and method proceed to Step 1210. In Step 1210, the system and method undertake a contingency process. Step 1330 stops the steady state timer, and the system and method proceed to Step 1100, controlling torque application from the drive member to the driven member.

Figure 16:
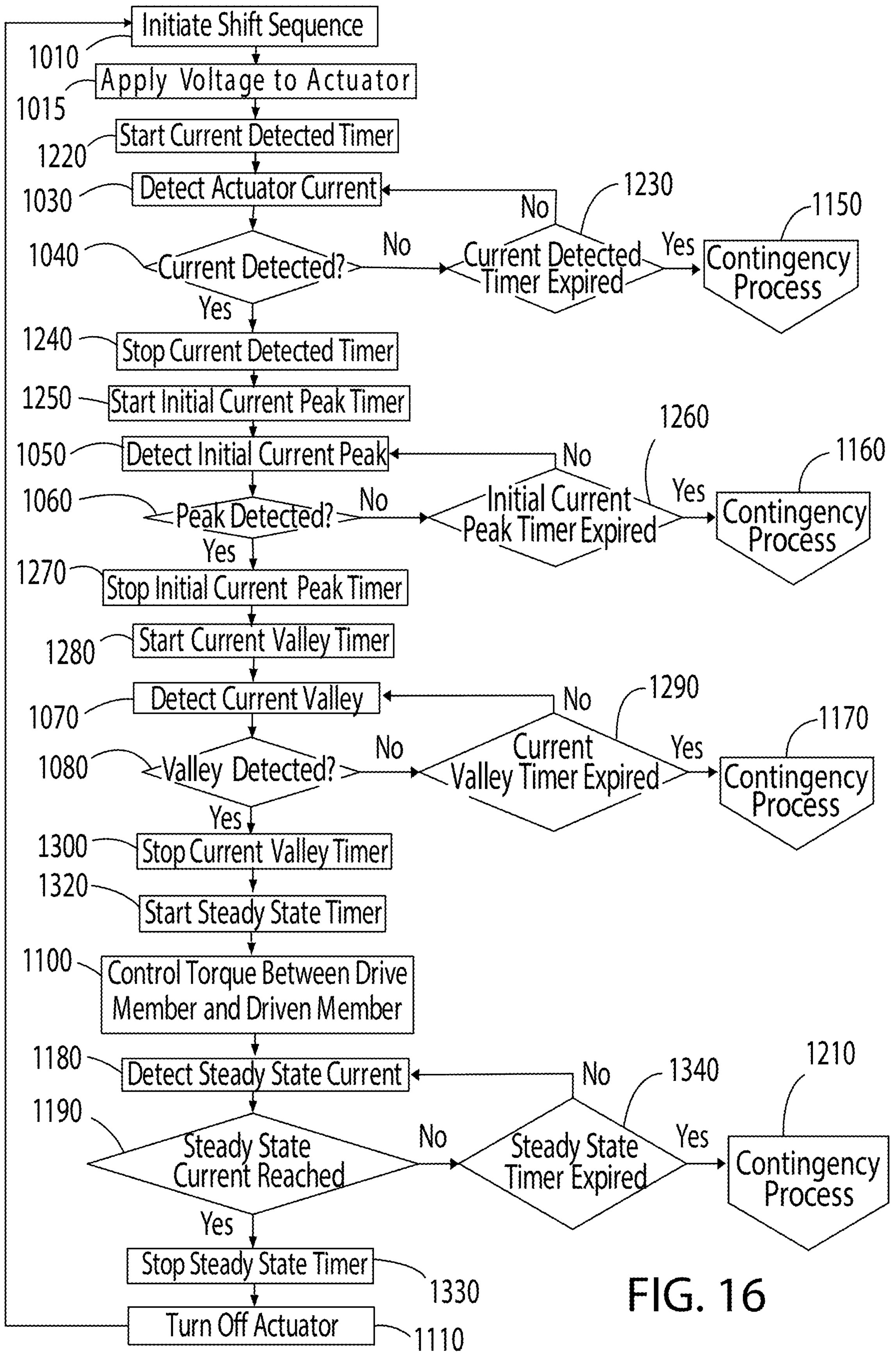
FIG. 16 is a flowchart of a further additional method according to the invention.

FIG. 16 is a further example of a system and method similar to the system and method of FIG. 15, wherein Step 1100, controlling torque between the drive member and the driven member, occurs either after or concurrently with Step 1320. In another example, Step 1100, controlling torque between the drive member and the driven member, occurs after Step 1080. While shown occurring after Step 1300, stop valley timer, and Step 1320, start steady state timer, Step 1100 may occur before or concurrently with these steps.

Similar to FIG. 11, FIGS. 12-16 show the system and method returns to the initiate shift sequence, Step 1010, and waits to initiate a new shift sequence.

The system and method of the present invention enables torque application based on the movement of the actuator, not the expiration of a predetermined time. The foregoing system and method may also reduce instances of torque split, an unintended difference in torque application between wheels—for example, a torque interruption on some driven wheels but not others. A risk of torque split exists in drivetrains where the driven wheels are not driven exclusively full-time. Torque split avoidance is a concern in drivetrains with wheel disconnect systems or axle-based drive units with multiple speeds. To avoid torque split, torque is not applied to the wheels until the actuators associated with each wheel have moved. For example, the power and corresponding torque from the drive member to the driven member is applied immediately after the actuator has reached the end of motion. The system and method also enable a predetermined delay of torque application, with the delay based on actuator motion. Applying the torque over a shortened or lengthened time varies shift characteristics. The system and method enable a change in vehicle performance. For example, torque application over a shorter period results in a "harsher" shift with faster acceleration. Extending torque application over a longer period results in a "smoother" shift with a slower acceleration.

The description of the invention is merely exemplary. Thus, variations that do not depart from the gist of the invention are intended to be within the scope of the invention. Such variations are not to be regarded as a departure from the spirit and scope of the invention.

What is claimed is:

1. A method for controlling torque transfer in a clutch assembly comprising:

providing a selectable coupling having a first, torque transmitting position and a second, non-torque transmitting position;

providing an actuator, the actuator acting on the selectable coupling to move the selectable coupling between the first, torque transmitting position and the second non-torque transmitting position;

supplying voltage to the actuator;

detecting a back electromotive force in the actuator;

determining motion of the actuator based on the detection of a back electromotive force; and moving the selectable coupling based on the motion of the actuator.

2. The method for controlling torque transfer in a clutch assembly set forth in claim 1, including the step of turning off the voltage to the actuator.

3. The method for controlling torque transfer in a clutch assembly set forth in claim 1, wherein the step of detecting a back electromotive force in the actuator includes detecting an initial peak in an actuator current and detecting a current valley in the actuator current.

4. A torque transmission assembly comprising:

an actuator, the actuator includes a stator with a coil and a translator with a magnet;

a back electromotive force detection unit generating a signal based on movement of the translator relative to the stator; and a coupling member transferring torque from a drive member to a driven member based on the signal from the back electromotive force detection unit.

5. The torque transmission assembly of claim 4, including:

the stator having an electromagnetically inductive coil; and the translator having magnetic segments.

6. The torque transmission assembly of claim 4, including;

a power source;

a bridge circuit, including a plurality of switches, the power source connected to the bridge circuit;

a sensor connected to the bridge circuit, the sensor generating an output signal based on current feedback from the actuator; and a controller receiving the output signal from the sensor and generating an output.

7. The torque transmission assembly of claim 6, wherein:

the controller includes an analog to digital converter, the analog to digital converter generating an output signal based on the output signal of the sensor; and the output signal controlling the switches.

* * * * *